United States Patent [19]
Kydd et al.

[11] 3,724,261
[45] Apr. 3, 1973

[54] DEVICE FOR MEASURING HEAT RELEASE IN CONTINUOUS CALORIMETER

[75] Inventors: Paul H. Kydd, Scotia; George Jernakoff, both of New York, N.Y.

[73] Assignee: General Electric Company, Schenectady, N.Y.

[22] Filed: Aug. 31, 1971

[21] Appl. No.: 176,475

[52] U.S. Cl. ................................................73/190 R
[51] Int. Cl. ............................................G01k 17/00
[58] Field of Search ................................73/190, 193

[56] References Cited

UNITED STATES PATENTS

| | | | |
|---|---|---|---|
| 3,589,184 | 6/1971 | Moore | 73/190 |
| 2,026,179 | 12/1935 | Keith | 73/190 |
| 2,398,606 | 4/1946 | Wang | 73/193 X |
| 3,167,957 | 2/1965 | Ziviani | 73/193 |
| 2,931,222 | 4/1960 | Noldge et al. | 73/193 |

Primary Examiner—Herbert Goldstein
Attorney—John F. Ahern et al.

[57] ABSTRACT

Voltages reflecting the heat released in a continuous calorimeter and absorbed by the coolant flow therethrough are sensed and converted to a convenient parameter by means of the device described herein. The device comprises in combination an electric heater disposed to heat the coolant flow downstream of the calorimeter; means for controlling power input to the electric heater; a first and second pair of means for generating an electromotive force (EMF) as a function of temperature differential (e.g. thermocouples); means (e.g., a strip chart recorder) electrically connected to said first and second pair of generating means for comparing the voltage outputs thereof and continuously displaying the relation therebetween (or some parameter related thereto); the EMF-generating means being disposed in contact with the coolant flow and being electrically connected to the comparing and display means; the two EMF-generating means of the first pair being disposed at the inlet and outlet, respectively, of the coolant flow to and from the calorimeter and the two EMF-generating means of the second pair being located downstream of the first pair with one upstream and one downstream of the electric heater.

9 Claims, 2 Drawing Figures

Inventors:
Paul H. Kydd,
George Jernakoff,
by [signature]
Their Attorney.

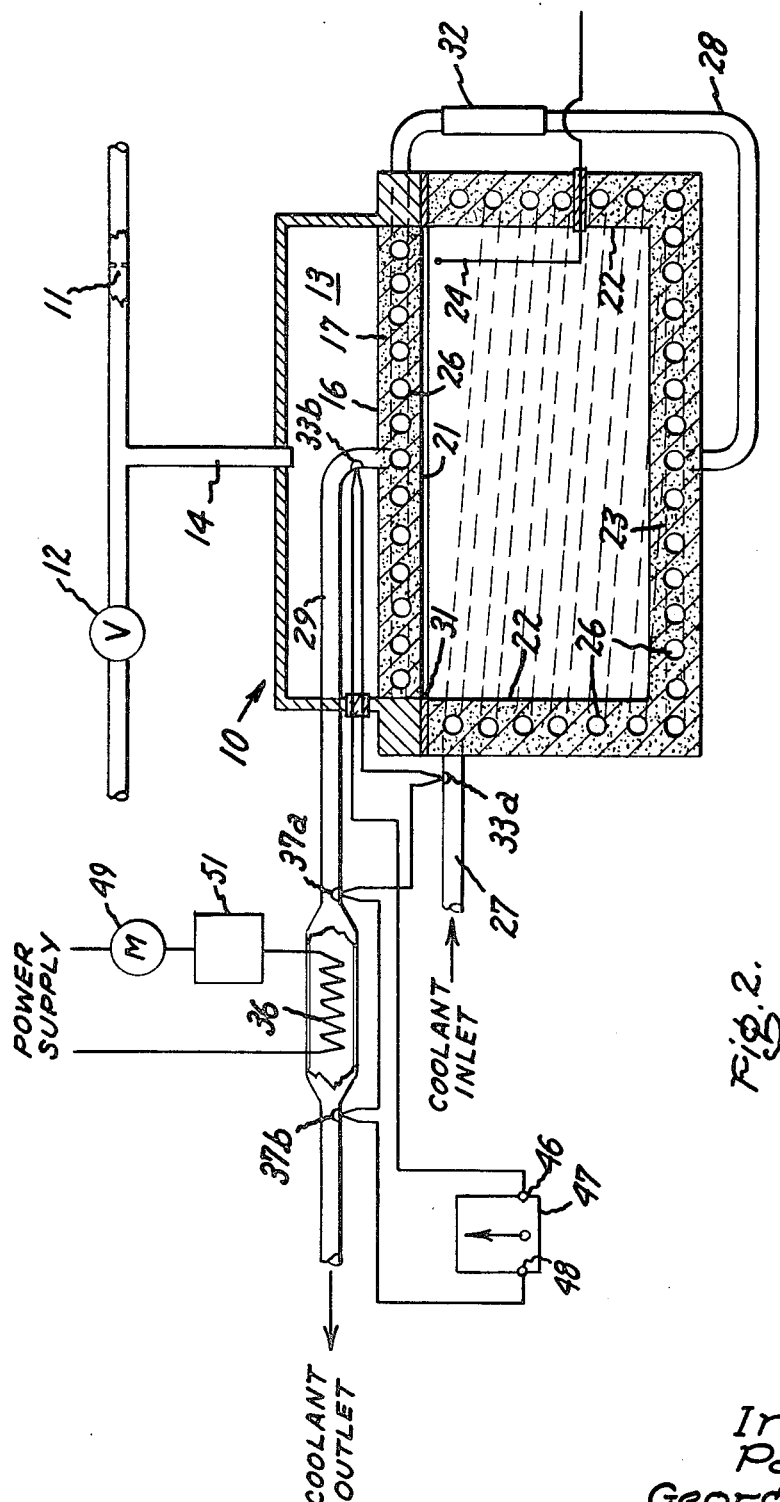

DEVICE FOR MEASURING HEAT RELEASE IN CONTINUOUS CALORIMETER

BACKGROUND OF THE INVENTION

The calorific value of any combustible gas measured in British Thermal Units (BTU) is an important factor, because the chemical potential energy of a gaseous fuel is the principal measure of its ability to perform a given service (e.g. heating), with the exception of the type of application in which flame intensity is the principal criterion. In accordance with the principle that the value of such gas is reflected in its calorific value, in many locations fuel gas is purchased and sold on a therm (100,000 BTU's) basis. This basis of sale requires suitable equipment for accurately determining the calorific value (in BTU/sec or BTU/SCF) of the gas passing from the seller to the consumer.

The water-flow calorimeter has been accepted as a standard for calorific value measurement by many utility companies and utility regulating agencies. The essential parts of such commercial devices are meters for the gas, for the combustion air and for the ambient air used for heat absorption, a motor gear reduction unit, a water pump for the coolant water, temperature sensing means for the entering and leaving water and for the heated air, heat exchange means with which to cause air to absorb the heat of combustion and recording means to measure the temperature differences occurring in the temperature sensing devices.

Two widely recognized types of equipment for this purpose are commonly known as "Junkers Calorimeters" and "Cutler-Hammer Recording Calorimeters" (both employ water flow calorimetry). A considerably simplified and precise water-flow gas calorimeter is described in U. S. Pat. No. 3,589,184 — Moore and the instant invention will be characterized in connection therewith.

SUMMARY OF THE INVENTION

The instant invention is a further improvement in water-flow gas calorimeter construction whereby the necessity for measuring either the coolant flow or the temperature rise of the coolant may be obviated. Further, fluctuations in coolant flow are not objectionable.

In the improved construction of the instant invention the coolant circuit for the gas calorimeter includes two pairs of identical thermocouples (or similar means for generating electromotive force as a function of temperature differential, e.g. thermistors, resistance thermometers), the two thermocouples of each pair of thermocouples being located in contact with the coolant flow. The first pair of thermocouples is located with one thermocouple at the inlet of the coolant flow to the calorimeter and the other thermocouple at the outlet of the coolant flow from the calorimeter, while the thermocouples of the second pair of thermocouples are located at spaced first and second stations downstream of the coolant outlet. Electric heating means are disposed in the system to heat the coolant flow passing between the spaced stations and means are electrically connected to the heating means for controlling power input thereto. The first and second pairs of thermocouples are electrically connected to means (e.g. a strip chart recorder) for comparing the voltage outputs thereof and continuously displaying the relation between these voltage outputs or some parameter related thereto.

Once the power input to the electric heater has been adjusted to assure a constant preselected heat release from the heater, the heating value of the gas being supplied can be obtained as a direct and continuous reading bearing a constant relationship to the electric power input to the heater.

BRIEF DESCRIPTION OF THE DRAWING

The exact nature of this invention as well as other objects and advantages thereof will be readily apparent from consideration of the following specification relating to the annexed drawing in which:

FIG. 1 is a schematic representation of the preferred embodiment of this invention shown embodied in the cooling circuit of a water-flow gas calorimeter and FIG. 2 is a similar view of an alternate construction.

DESCRIPTION OF THE PREFERRED EMBODIMENT

Figure 1:
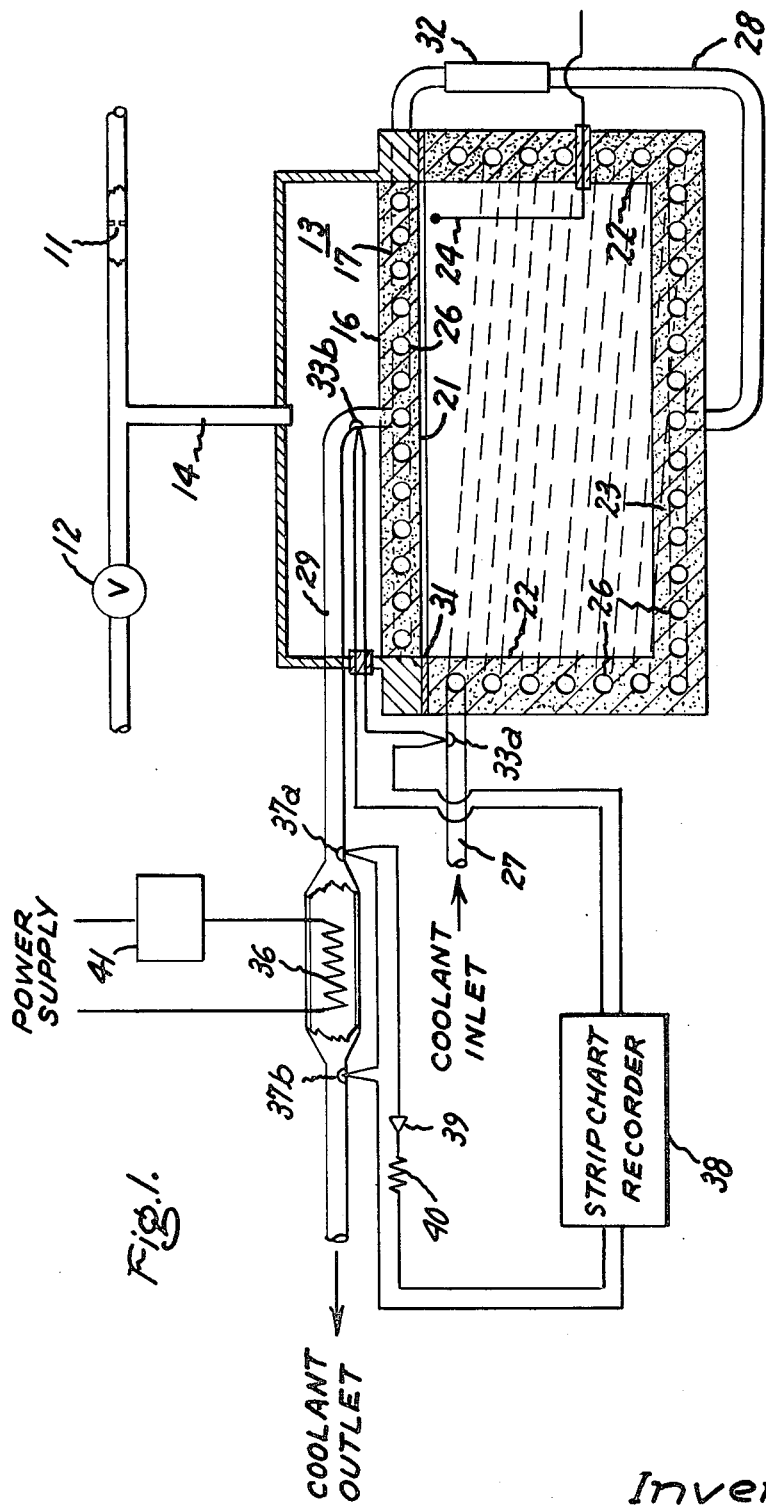

Continuous entry of a sampling of the gas stream to be monitored into calorimeter device 10 (described more completely in the Moore patent, incorporated by reference) is made through unit 11. This unit may be a throttling device, such as a critical flow orifice meter to provide a constant sample flow rate into the calorimeter 10 or a ratio metering device to sample in a constant proportion of the main stream. Simultaneously, air enters through metering valve 12 in an amount slightly in excess of the quantity required to completely burn the entering gas. It is necessary that the gas be metered with an accuracy at least as great as the accuracy desired in the parameter to be determined, e.g. BTU/standard cubic foot or BTU/sec, while the air need not be as accurately metered and may be determined to an accuracy of about 5 to 10 percent. The gas and combustion air enter closed plenum 13 via conduit 14 at ambient temperature mixing in transit such that an air/gas mixture with a slight excess of air is presented to face 16 of the porous sintered metal burner plate 17, the velocity of the unburned mixture being less than the normal burning velocity of the particular air/gas combination.

By way of illustration, burner 17 may be made of copper particles sintered together and defining interconnecting voids permitting continuous passage of the gas mixture through the sintered body 17 from face 16 to face 21.

For this application, other metals may be employed in place of copper, for example, bronze shot, nickel shot or any structurally sound metallic shot material having a thermal conductivity at least 30 per cent of the value of thermal conductivity for sintered copper shot may be used both for the construction of burner plate 17, and also for the condenser portion of the device 10 comprising cylindrical wall 22 and bottom 23.

When the unburned gas mixture reaches face 21 (there having previously been ignition at face 21 by means of spark igniter 24), it burns as a flat flame spread over face 21. The heat generated by the burning mixture is rejected in part to the burner body 17 with the burned gas eventually passing through the wall surfaces 22 and 23 leaving the device substantially at ambient (within 2°–3°C of the initial air/gas temperature) for release as flue gas.

Cooling of the combustion products to ambient temperatures is accomplished by passing a cooling fluid through the continuous single copper cooling conduit 26, most of which is embedded in the sintered metal walls 22, 23 and in burner plate 17 for the circulation of cooling water therethrough. In the construction shown in FIG. 1, the cooling water (at or below room temperature, 23°C) enters end 27 of conduit 26, proceeds through the length of the coiled conduit configuration embedded in wall 22, traverses the spiral configuration embedded in base 23, passes along external leg 28 (normally insulated) to reach the flat spiral configuration embedded in burner plate 17, and exits from the cooling system via end 29 of the continuous cooling tube 26.

In this manner, the total of the heat generated during the combustion of the metered gas input at surface 21 is absorbed in the cooling water (with the exception of the heat in the water vapor content of the exiting gases). Heat rejected to burner plate 17 is efficiently removed therefrom by the coolant circulated therein, while at the same time the gaseous product of combustion plus any excess air pass through walls 22 and 23 and are cooled by the cooling water traversing coolant conduit 26 whereby the balance of the combustion-generated heat is absorbed.

The burner plate 17 is separate from the cup-shaped condenser (walls 22 and 23) and is assembled thereto in sealed engagement by interposing a sealant layer 31 (e.g. a silicone rubber gasket) therebetween. Removal of plate 17 to expose the cavity is facilitated by the inclusion of flexible coupling 32 in external leg 28.

The differential between the temperature of the incoming coolant and the exiting coolant generates an electromotive force across the pair of thermocouples 33a, 33b that reflects substantially all of the heat generated during the combustion. As shown, the thermocouples in each of the thermocouple pairs are joined by an element common to each individual thermocouple. The thermocouples should be electrically insulated from the conduits in which they are mounted, if the conduits are made of electrically conducting material.

Downstream in conduit 29 the coolant flow receives heat from electric heater 36 as the flow passes thereby. The extent to which the temperature of the flow is raised by heater 36 in transit between thermocouples 37a and 37b (the second thermocouple pair) will determine the extent of electromotive force generated thereby.

Thermocouples 37a and 37b are electrically connected to recorder 38 as, for example, to provide a reference voltage input thereto. Thermocouple 37a is shown connected to recorder 38 via amplifier 39 and resistor 40. The thermocouples 33a, 33b are electrically connected and provide the normal input to the recorder 38.

With this arrangement calibration is easily accomplished. A gas of known heating value is burned in calorimeter 10 and, simultaneously, control 41 is set to adjust the power input to heater 36 to generate a voltage in thermocouple pair 37a, 37b such as will bring about a desired reading on recorder 38, for example, a reading numerically equal to the known heating value of the calibration gas. Thus, in essence, a constant ratio is established for the calibration gas between the chemical energy of the gas and the electrical energy provided to the electric heater.

Thereafter, with this given constant power input to generate a reference voltage input, the readout on the recorder will reflect the actual heating value (BTU/sec or BTU/SCF) of a gas flow (having this approximate heating value) being burned in calorimeter 10. Further, by connecting an integrator in the system the output of recorder 38 in BTU over any given period of time can be made available to reflect total BTU's (or therms) delivered via the main flow.

In the arrangement shown in FIG. 2 all components identified by the same numerals are the same as in FIG. 1, however, thermocouples 33a, 33b, 37a and 37b are connected differently. Thus, the upstream thermocouples 33a, 37a are interconnected electrically. Thermocouple 33b is connected to terminal 46 of galvanometer 47 (i.e. means for sensing and comparing the intensity and direction of current flow) and thermocouple 37b is connected to terminal 48 thereof. Connected in this manner the voltages applied to galvanometer 47 are opposite in direction.

When the input of heat via heater 36 to the coolant flow is equal to the combustion heat absorbed by the coolant, the two voltages generated in thermocouple pairs 37a, 37b and 33a, 33b are opposite in direction and will cancel each other producing a null reading on the galvanometer. Under this set of conditions the electric power expended (and recorded on wattmeter 49) will be identically equal (in fundamental units) to the chemical heat released in the calorimeter.

As variations in the calorific value of the sampled gas occur, the votage from one or the other pair of thermocouples will exceed the opposing voltage. Power input to heater 36 will then be increased or reduced by the operator by resetting controller 51 so as to increase or reduce the votlage applied to terminal 48 to cancel out the voltage applied to terminal 46.

Thus, the total power expended and recorded on meter 49 over a period of time, when multiplied by an appropriate constant will be a measure of the chemical potential energy of the gas at constant gas sample rate or of the energy flow in a pipeline if a constant proportion of the total flow is taken as a sample without need for measuring coolant flow, coolant temperature or temperature rise in the coolant.

Instead of the manual correction required in the structure of FIG. 2, this device can be made to operate automatically. Thus, thermocouples 33b, 37b could be connected to a chopper (not shown) and any error signal passing therethrough would be amplified and used to reset controller 51 (as by means of a servomotor, not shown) so as to diminish and eliminate the error signal.

All water vapor from the combustion process (with the exception of the saturation water vapor content in the exiting gases) is condensed during passage of the gases through walls 22 and 23 and is forced through these porous walls to drip from the exterior thereof. The pressure drop from downstream of the metering means for the gas and air to the exterior of condenser walls 22 and 23 is about 2 psi or less. The pressure necessary to overcome this drop may either by supplied at the inlet to calorimeter 10 or, if desired, by applying suction by means not shown to the exterior surfaces of the condenser.

The exit temperature of the burned products is within a few degrees of the water temperature, so all of the heat of combustion is recovered or accountable by a simple correction. Any excess air that accompanies the product also leaves at the water temperature and there is no correction necessary for that heat carried with it nor is there any need to meter it with extreme accuracy.

All exterior surfaces are at, or very close to, ambient temperature, therefore, virtually no heat leak corrections are required. Any combustible gas (representing wide variations in BTU/SCF of gas) can be monitored with only minor adjustments, if any, in gas/air flows and controllers 41, 51 without the need for measuring either the coolant flow or the temperature rise therein.

What we claim as new and desire to secure by Letters Patent of the United States is:

1. In a calorimeter for measuring the chemical energy content of a combustible gas wherein a combustion chamber is disposed in flow communication with means for effecting heat exchange between the products of combustion and a liquid coolant flow; means are connected to said heat exchange means for admitting liquid coolant flow thereto; means are connected to said heat exchange means for removing liquid coolant flow therefrom, first and second means, respectively, are provided for sensing the temperature of coolant flow entering and leaving said heat exchange means; said first and second sensing means being electrically interconnected so that known quantities of said gas can be admitted to and burned in said combustion chamber and the resulting temperature rise in the coolant flow can be measured, the combination with said coolant flow removing means of:
   a. means for electrically heating said coolant flow located downstream of said second sensing means;
   b. means electrically connected to said heating means for adjusting electric power input thereto at a preselected level;
   c. third means for sensing the temperature of the coolant flow at a location between said second sensing means and said heating means;
   d. fourth means electrically connected to said third sensing means for sensing the temperature of the coolant flow at a location downstream of said heating means and
   e. means electrically connected to said third and fourth sensing means and receiving a reference voltage input therefrom for comparing the voltage output of said first and second sensing means with said reference voltage and indicating therefrom the actual heating value of the combustible gas.

2. The combination of claim 1 wherein the comparing and indicating means is a strip chart recorder.

3. The combination of claim 1 wherein the sensing means are thermocouples.

4. The combination of claim 1 wherein the heating means is located within the means for removing coolant flow.

5. In a method for measuring the chemical energy content of a combustible gas by burning known quantities of the gas with air, effecting heat exchange between the combustion products and at least one fluid coolant flow and sensing the temperature of coolant flow entering and leaving the heat exchanger whereby the chemical energy of the combustion gas can be determined knowing the flow rate of the air, the added steps of:
   a. continuously introducing heat energy into the coolant flow downstream of said heat exchanger at a predetermined rate sufficient to raise the temperature of the coolant flow a preselected amount corresponding to the rise in temperature of the coolant flow brought about by combustion of a gas of known calorific value,
   b. continuously sensing the rise in temperature in the coolant flow by the introduction of heat energy in step a) and
   c. continuously comparing the actual temperature rise in the coolant flow by heat exchange with the preselected temperature rise in the coolant flow downstream of said heat exchanger by the introduction of heat energy and indicating therefrom the actual heating value of the combustible gas.

6. The method of claim 5 wherein electric heating is employed downstream of said heat exchanger.

7. The method of claim 6 wherein the rise in temperature of the coolant in the heat exchanger and the rise in temperature of the coolant flow by electric heating are each determined using means for generating an electromotive force as a function of temperature differential.

8. The method of claim 7 wherein the electromotive force-generating means are thermocouples.

9. The method of claim 5 wherein the continuous comparison of temperature rises is recorded.

* * * * *